US011954990B2

(12) United States Patent
Albero et al.

(10) Patent No.: US 11,954,990 B2
(45) Date of Patent: Apr. 9, 2024

(54) ARTIFICIAL INTELLIGENCE (AI)-BASED SECURITY SYSTEMS FOR MONITORING AND SECURING PHYSICAL LOCATIONS

(71) Applicant: Bank of America Corporation, Charlotte, NC (US)

(72) Inventors: George Anthony Albero, Charlotte, NC (US); Nathalie Elizabeth Conley, Jacksonville, FL (US); Elizabeth Jordan Knight, Clover, SC (US); Lauren Thanh Nguyen-Lo, Houston, TX (US); Robert Jon Armstrong, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 282 days.

(21) Appl. No.: 17/356,151

(22) Filed: Jun. 23, 2021

(65) Prior Publication Data
US 2022/0415149 A1 Dec. 29, 2022

(51) Int. Cl.
G08B 13/22 (2006.01)
G06N 3/08 (2023.01)
G06V 20/52 (2022.01)
G07C 9/00 (2020.01)

(52) U.S. Cl.
CPC ............ *G08B 13/22* (2013.01); *G06N 3/08* (2013.01); *G06V 20/52* (2022.01); *G07C 9/00309* (2013.01); *G07C 2009/00476* (2013.01)

(58) Field of Classification Search
CPC .......... G08B 13/22; G06N 3/08; G06V 20/52; G07C 9/00309; G07C 2009/00476
See application file for complete search history.

(56) References Cited

U.S. PATENT DOCUMENTS

| 3,926,101 | A  | 12/1975 | Moss |
| 5,747,719 | A  | 5/1998 | Bottesch |
| 6,932,703 | B1 | 8/2005 | Ritchie |
| 7,726,557 | B2 | 6/2010 | Bosch et al. |
| 8,332,321 | B2 | 12/2012 | Bosch et al. |

(Continued)

FOREIGN PATENT DOCUMENTS

| CN | 102866179 B | | 6/2014 |
| CN | 106323452 A | * | 1/2017 |

(Continued)

OTHER PUBLICATIONS

George Seif, The 5 Clustering Algorithms Data Scientists Need to Know, Feb. 5, 2018, https://towardsdatascience.com/the-5-clustering-algorithms-data-scientists-need-to-know-a36d136ef68 (Year: 2018).*

(Continued)

*Primary Examiner* — Quan Zhen Wang
*Assistant Examiner* — Rajsheed O Black-Childress
(74) *Attorney, Agent, or Firm* — Banner & Witcoff, Ltd.

(57) ABSTRACT

Various aspects of the disclosure relate to monitoring a physical location to determine and/or predict anomalous activities. One or more machine learning algorithms may be used to analyze inputs from one or more sensors, cameras, audio recording equipment, and/or any other types of sensors to detect anomalous measurements/patterns. Notifications may be sent one or more devices in a network based on the detection.

18 Claims, 7 Drawing Sheets

(56) References Cited

U.S. PATENT DOCUMENTS

| | | | |
|---|---|---|---|
| 8,903,149 | B1 | 12/2014 | Noujeim |
| 8,928,476 | B2 | 1/2015 | Jerhotova et al. |
| 8,939,358 | B2 | 1/2015 | Cardinal et al. |
| 9,886,831 | B1 | 2/2018 | Svoboda et al. |
| 9,899,725 | B2 | 2/2018 | Soliman et al. |
| 9,911,055 | B2 | 3/2018 | Kozitsky et al. |
| 10,529,221 | B2 | 1/2020 | Jarrell et al. |
| 10,810,845 | B2 | 10/2020 | Coles |
| 10,872,293 | B2 | 12/2020 | Dunning et al. |
| 11,417,102 | B1* | 8/2022 | Meingast ............... G06V 10/16 |
| 11,536,678 | B2 | 12/2022 | Makaram et al. |
| 11,537,749 | B2 | 12/2022 | Schluntz et al. |
| 11,537,913 | B2 | 12/2022 | Johnson et al. |
| 2010/0176950 | A1 | 7/2010 | Bartholf et al. |
| 2013/0008787 | A1 | 1/2013 | Mammoto et al. |
| 2016/0231278 | A1 | 8/2016 | Goroshevskiy et al. |
| 2016/0237732 | A1 | 8/2016 | Kerley |
| 2017/0098172 | A1 | 4/2017 | Ellenbogen et al. |
| 2017/0098357 | A1 | 4/2017 | Hoy |
| 2017/0122909 | A1 | 5/2017 | Goroshevskiy et al. |
| 2018/0217252 | A1 | 8/2018 | Noujeim et al. |
| 2018/0367873 | A1* | 12/2018 | Schattmaier ........... G08B 31/00 |
| 2020/0167631 | A1 | 5/2020 | Rezgui |
| 2020/0202685 | A1 | 6/2020 | Gjertsen et al. |
| 2020/0232767 | A1 | 7/2020 | Riden |
| 2020/0250959 | A1 | 8/2020 | Laurans et al. |
| 2020/0401793 | A1 | 12/2020 | Leung et al. |
| 2021/0097790 | A1 | 4/2021 | Diep |
| 2021/0131692 | A1 | 5/2021 | Martin |
| 2021/0285907 | A1 | 9/2021 | Makaram et al. |
| 2021/0300674 | A1 | 9/2021 | Baur et al. |
| 2021/0317697 | A1 | 10/2021 | Tulsidas |
| 2021/0356448 | A1 | 11/2021 | Wu et al. |
| 2021/0390807 | A1* | 12/2021 | Chaurasia ................ G07C 9/27 |
| 2022/0067410 | A1 | 3/2022 | Raz et al. |
| 2022/0099570 | A1 | 3/2022 | Matsuda et al. |
| 2022/0114817 | A1 | 4/2022 | Gronau |
| 2022/0128428 | A1 | 4/2022 | Clark |
| 2022/0130293 | A1 | 4/2022 | Cline et al. |
| 2022/0141239 | A1 | 5/2022 | Zaman et al. |
| 2022/0161075 | A1 | 5/2022 | Snook et al. |
| 2022/0335817 | A1 | 10/2022 | Schober et al. |
| 2022/0352697 | A1 | 11/2022 | Takano et al. |
| 2022/0407176 | A1 | 12/2022 | Ryder et al. |
| 2022/0415138 | A1 | 12/2022 | Albero et al. |
| 2022/0415146 | A1 | 12/2022 | Albero et al. |
| 2022/0415149 | A1 | 12/2022 | Albero et al. |

FOREIGN PATENT DOCUMENTS

| | | | |
|---|---|---|---|
| CN | 107292250 | A | 10/2017 |
| CN | 110956111 | A | 4/2020 |
| JP | 2004341838 | A * | 12/2004 |
| JP | 2019124012 | A * | 7/2019 |
| KR | 101814368 | B1 | 1/2018 |
| WO | 2018192396 | A1 | 10/2018 |
| WO | WO-2022011329 | A1 * | 1/2022 |

OTHER PUBLICATIONS

Vladimir Fedak, Top 10 Most Popular AI Models, Nov. 8, 2018, https://dzone.com/articles/top-10-most-popular-ai-models (Year: 2018).* https://en.wikipedia.org/wiki/Artificial_intelligence (Year: 2023).* https://en.wikipedia.org/wiki/Unsupervised_learning (Year: 2023).* https://en.wikipedia.org/wiki/Supervised_learning (Year: 2023).*

Subutai Ahmada, Alexander Lavina, Scott Purdya, and Zuha Agha, "Unsupervised real-time anomaly detection for streaming data", Nov. 1, 2017, Neurocomputing vol. 262 (Year: 2017).*

Salima Omar, Asri Ngadi, and Hamid H. Jebur, "Machine Learning Techniques for Anomaly Detection: An Overview", Oct. 2013, International Journal of Computer Applications, vol. 79—No. 2 (Year: 2013).*

Deininger "Leveraging Artificial Intelligence in Gas Sensing"; https://www.renesas.com/us/en/blogs/leveraging-artificial-intelligence-gas-sensing; article, 3 pages, downloaded Jun. 16, 2021.

Holcomb; AI-powered gas leak detection technology improves workplace safety: https://epplus.hartenergy.com/issue/january-2021/ai-powered-gas-leak-detection-technology-improves-workplace-safety/; article; 7 pages, downloaded Jun. 16, 2021.

Emerj; "AI for Physical Security—4 Current Applications"; https://emerj.com/ai-sector-overviews/ai-for-physical-security/; article; 15 pages; downloaded Jun. 16, 2021.

Millennium Fire & Security; "How AI Can Benefit Security Systems"; https://www.millennium-fire.com/how-ai-can-benefit-security-systems/; article; 3 pages; downloaded Jun. 16, 2021.

Plugg-D Why AI is the future of home security; https://thenextweb.com/news/why-ai-is-the-future-of-home-security; article; 8 pages; Nov. 30, 2020.

* cited by examiner

ARTIFICIAL INTELLIGENCE (AI)-BASED SECURITY SYSTEMS FOR MONITORING AND SECURING PHYSICAL LOCATIONS

FIELD

Aspects described herein generally relate to the field of electronic security systems for monitoring physical locations, and more specifically to predicting possible security threats and initiating remedial measures.

BACKGROUND

Conventional approaches to securing physical locations (e.g., offices, malls, banks, public venues, etc.) generally use electronic surveillance systems (e.g., audio/video surveillance systems), manual approaches (e.g., security personnel), or a combination of the two. For example, a physical location may be equipped with one or more cameras which may transmit video feeds to a monitoring location for manual inspection to detect potential threats or ongoing activities. Additionally, or alternatively, security personnel at the physical location may monitor proceedings to determine malicious activities, initiate remedial measures, and/or alert authorities.

SUMMARY

Aspects of the disclosure provide solutions that address and overcome technical problems associated with network security. In particular, one or more aspects of the disclosure relate to monitoring and securing physical locations (such as retail banking facilities) based on artificial intelligence (AI)-based modeling of movement patterns and sensor measurements. Remedial measures may be initiated for securing the physical location based on detection of anomalies in movement patterns, sensor measurements, and/or other criteria.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect may include an artificial intelligence (AI)-based system for monitoring and securing a retail banking physical location based on measurements of gas concentrations. The system may include one or more gas sensors installed near an entrance of the physical location for measuring gas concentrations of a plurality of target gases at the physical location at a plurality of times. The system may include a locking mechanism of a door at the entrance of the physical location. The system may also include an electronic monitoring platform communicatively coupled to the one or more gas sensors and the one or more actuators. The electronic monitoring platform may include: at least one processor; a communication interface communicatively coupled to the at least one processor; and memory storing computer-readable instructions that, when executed by the at least one processor, cause the electronic monitoring platform to perform one or more operations recited herein. For example, the electronic monitoring platform may receive, via the communication interface and from the one or more gas sensors, measurements of gas concentrations of the plurality of target gases at the plurality of times. The electronic monitoring platform may train, based on the gas concentrations at the plurality of times, an AI model of gas concentrations of the plurality of target gases. The electronic monitoring platform may predict, based on the AI model, gas concentrations of the plurality of target gases for a time $t1$. The electronic monitoring platform may receive, from the one or more sensors and for the time $t1$, a second measurement of gas concentrations of the plurality of target gases. The electronic monitoring platform may determine, based on the predicted gas concentrations and the second measurement, that a gas concentration of a target gas for the time $t1$ is anomalous. Based on the determining the electronic monitoring platform may: (1) send, via the communication interface, a notification to the locking mechanism of the door, where the locking mechanism is configured to lock the door based on receiving the notification; and/or (2) send, via the communication interface and to a computing device, an alert notification. Other embodiments of this aspect include corresponding computer systems, apparatus, and computer programs recorded on one or more computer storage devices, each configured to perform the actions of the methods.

The one or more gas sensors may include one of: electrochemical gas sensors; gas chromatographs; ion-mobility spectrometers; surface acoustic wave sensors; spectrophotometric sensors; chemiresistive gas sensors; and combinations thereof. The electronic monitoring platform may send, via the communication interface and based on the determining, a second notification to a locking mechanism of a vault at the physical location, where the locking mechanism is configured to lock the vault based on receiving the notification. The electronic monitoring platform may send, via the communication interface and based on the determining, a second notification to a regulator that controls a rotational speed of a fan located at the entrance, where the regulator is configured to increase the rotational speed of the fan based on receiving the second notification. The plurality of target gases may include one of: vapors associated with gunpowder residue; vapors associated with explosive materials; smoke; and combinations thereof. Determining that the gas concentration for the time $t1$ is anomalous may be based on the gas concentration exceeding a predicted gas concentration of the target gas by a threshold value. The threshold value may be a multiple of a standard deviation of gas concentrations of the target gas at the plurality of times. The training the AI model of gas concentrations may be further based on: times of days corresponding to the plurality of times; and days of weeks corresponding to the plurality of times. The AI model may be based on one of: a logistic regression algorithm; a decision tree algorithm; a random forest algorithm; a neural network algorithm; a support vector machine algorithm; and combinations thereof. Implementations of the described techniques may include hardware, a method or process, or computer software on a computer-accessible medium.

Another general aspect may include an AI-based system for monitoring and securing a retail banking physical location based on millimeter wave scanner measurements. The AI-based system may comprise a millimeter wave scanner configured to scan individuals, at the physical location, for detecting concealed objects, one or more actuators located at the physical location, and an electronic monitoring platform communicatively coupled to the millimeter wave scanner and the one or more actuators. The electronic monitoring platform may comprise: at least one processor; a communication interface communicatively coupled to the at least one processor; and memory storing computer-readable instructions that, when executed by the at least one processor, cause the electronic monitoring platform to perform one or more operations. For example, the electronic monitoring platform may receive, via the communication interface and from the millimeter wave scanner, measurements corresponding to concealed objects associated with a plurality of individuals at the physical location. The electronic monitoring platform may perform cluster analysis on the measurements to determine groups of normal measurements corresponding to the concealed objects associated with the plurality of individuals. The electronic monitoring platform may receive, from the millimeter wave scanner and for an individual at the physical location, a measurement corresponding to concealed objects associated with the individual. The electronic monitoring platform may determine, based on the groups of normal measurements, that the measurement corresponding to concealed objects associated with the individual is anomalous. The electronic monitoring platform may, based on the determining, send, via the communication interface, one or more notifications to the one or more actuators, where at least one actuator of the one or more actuators is associated with a shutter at a teller window in the physical location, and where the actuator causes the shutter to activate based on receiving a notification. The electronic monitoring platform may, based on the determining, send, via the communication interface and to a computing device, an alert notification. Other embodiments of this aspect include corresponding computer systems, apparatus, and computer programs recorded on one or more computer storage devices, each configured to perform the actions of the methods.

Implementations may include one or more of the following features. At least one second actuator of the one or more actuators may be associated with a vault in the physical location. The second actuator may cause the vault to lock based on receiving a second notification. The measurements may correspond to concealed metallic objects. The performing the cluster analysis may comprise performing one of: hierarchical clustering; centroid based clustering; density based clustering; distribution based clustering; and combinations thereof. The determining that the measurement is anomalous may be based on determining that distances between the measurement and core points associated with the groups are greater than a threshold value. The system further may include: one or more cameras configured to capture images associated with the physical location. The electronic monitoring platform may receive, via the communication interface and from the one or more cameras, the images. The electronic monitoring platform may perform, based on a convolutional neural network, image recognition analysis of the images to determine that the individual was at the physical location an anomalous number of times. The sending the one or more notifications may be further based on the determining that the individual was at the physical location an anomalous number of times. The system further may include: one or more cameras configured to capture videos associated with the physical location. The electronic monitoring platform may receive, from the one or more cameras, the videos and determine, based on the videos, gaits, paces, and postures associated with the plurality of individuals. The performing the cluster analysis to determine the groups may be further based on the determined gaits, paces, and postures. The electronic monitoring platform may determine, based on the videos, a gait, a pace, and a posture of the individual, wherein the determining that the measurement corresponding to concealed objects associated with the individual is anomalous is further based on the gait, the pace, and the posture of the individual. The electronic monitoring platform may determine the gaits, the paces, and the postures associated with the plurality of individuals based on an AI model. The AI model may be based on one of: a logistic regression model; a decision tree model; a random forest model; a neural network; a support vector machine; and combinations thereof. The measurements may include one of: sizes of the concealed objects; locations of the concealed objects; and combination thereof. Implementations of the described techniques may include hardware, a method or process, or computer software on a computer-accessible medium.

Another general aspect may include an AI-based system for monitoring and securing a retail banking physical location. The AI-based system may comprise one or more video cameras at the physical location, one or more actuators associated with security systems at the physical location, and an electronic monitoring platform communicatively coupled to the one or more video cameras and the one or more actuators. The electronic monitoring platform may comprise: at least one processor; a communication interface communicatively coupled to the at least one processor; and memory storing computer-readable instructions that, when executed by the at least one processor, cause the electronic monitoring platform to perform one or more operations. For example, the electronic monitoring platform may receive, from the one or more video cameras and via the communication interface, videos associated with the physical location. The electronic monitoring platform may identify, based on the videos, speech and movement patterns associated with a plurality of individuals at the physical location. The electronic monitoring platform may train, based on the speech and the movement patterns associated with the plurality of individuals, an AI model to recognize: normal movement patterns and normal speech; and anomalous movement patterns and anomalous speech. The electronic monitoring platform may identify, based on the videos, speech and a movement pattern associated with an individual. The electronic monitoring platform may determine, based on the AI model, that the speech and the movement pattern associated with the individual is anomalous. The electronic monitoring platform may, based on the determining send, via the communication interface, one or more notifications to the one or more actuators, wherein at least one actuator of the one or more actuators is associated with a vault in the physical location. The actuator may cause the vault to lock based on receiving a notification. Additionally or alternatively, the electronic monitoring platform may send, via the communication interface, an alert notification to a computing device. Other embodiments of this aspect include corresponding computer systems, apparatus, and computer programs recorded on one or more computer storage devices, each configured to perform the actions of the methods.

Implementations may include one or more of the following features. The electronic monitoring platform may receive, from one or more second video cameras in a second location adjacent to the physical location, a plurality of images. The electronic monitoring platform may, based on the determining: identify, based on an image recognition algorithm and in the plurality of images, the individual; and send, to the computing device and based on the identifying, the plurality of images. At least one second actuator of the one or more actuators may be associated with a shutter at a teller window in the physical location. The second actuator may cause the shutter to activate based on receiving a second notification. The training the AI model may be based on: archived videos associated with the physical location as stored in a database; and archived videos associated with other physical locations as stored in the database. The identifying the movement patterns associated with the plurality of individuals may include determining gaits, paces, and postures associated with the plurality of individuals. The training the AI model to recognize normal movement patterns and normal speech may include performing a cluster analysis to group normal movement patterns and normal speech. The determining that the movement pattern and the speech associated with the individual is anomalous is based on determining that the movement pattern and the speech associated with the individual is outside a group of normal movement patterns and normal speech. The performing the cluster analysis may include performing one of: hierarchical clustering; centroid based clustering; density based clustering; distribution based clustering; and combinations thereof. The AI model may be based on one of: a logistic regression model; a decision tree model; a random forest model; a convolutional neural network; a generative adversarial network; a support vector machine; and combinations thereof. The system further may include a millimeter wave scanner configured to scan individuals at the physical location. The electronic monitoring platform may receive, from the millimeter wave scanner, a measurement associated with the individual. The sending the one or more notifications may be further based on the measurement exceeding a threshold value. The measurement may correspond to a size of concealed objects associated with the individual. Implementations of the described techniques may include hardware, a method or process, or computer software on a computer-accessible medium.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Conventional electronic surveillance systems and manual approaches for securing physical locations may be incapable of preemptively detecting security threats. For example, many electronic surveillance systems are not monitored in real-time and only record activities for future use and investigation. Precursors associated with future malicious activities (e.g., suspects "scouting" a location prior to an attack) may evade detection via conventional approaches. While security personnel at a location may be able to detect suspicious activity, there is always a possibility of injury associated with these jobs. Automated entry-control systems (e.g., keycards), while providing a certain level of security, may not be foolproof as credentials may be mimicked or otherwise obtained by fraudulent means.

Technological advancements have enabled development and networking of sensors and systems capable of detecting various physical characteristics (e.g., millimeter wave scanners for remote metal detection, gas detectors for sniffing explosives, AI-based image analyses algorithms, etc.) for various applications. However, conventional approaches to securing physical locations may not optimally, and in real-time, leverage these other potential inputs to detect potential threats.

Various examples herein describe an artificial intelligence (AI)-based system for monitoring and securing physical locations. A machine learning algorithm may be used to train an AI model to detect anomalies in sensor measurements at the physical locations. The sensor measurements may correspond to gas concentration measurements, stress measurements, millimeter wave scanner measurements, and/or measurements associated with any other physical phenomena. Additionally, or alternatively, the AI model may be trained based on movement patterns, dressing patterns, micro expressions, and/or any other physical characteristics associated with individuals. Based on detection of the anomalies, remedial actions may be initiated (e.g., alerting appropriate personnel/authorities, initiating locking down of doors/vaults, etc.).

Figure 1A:
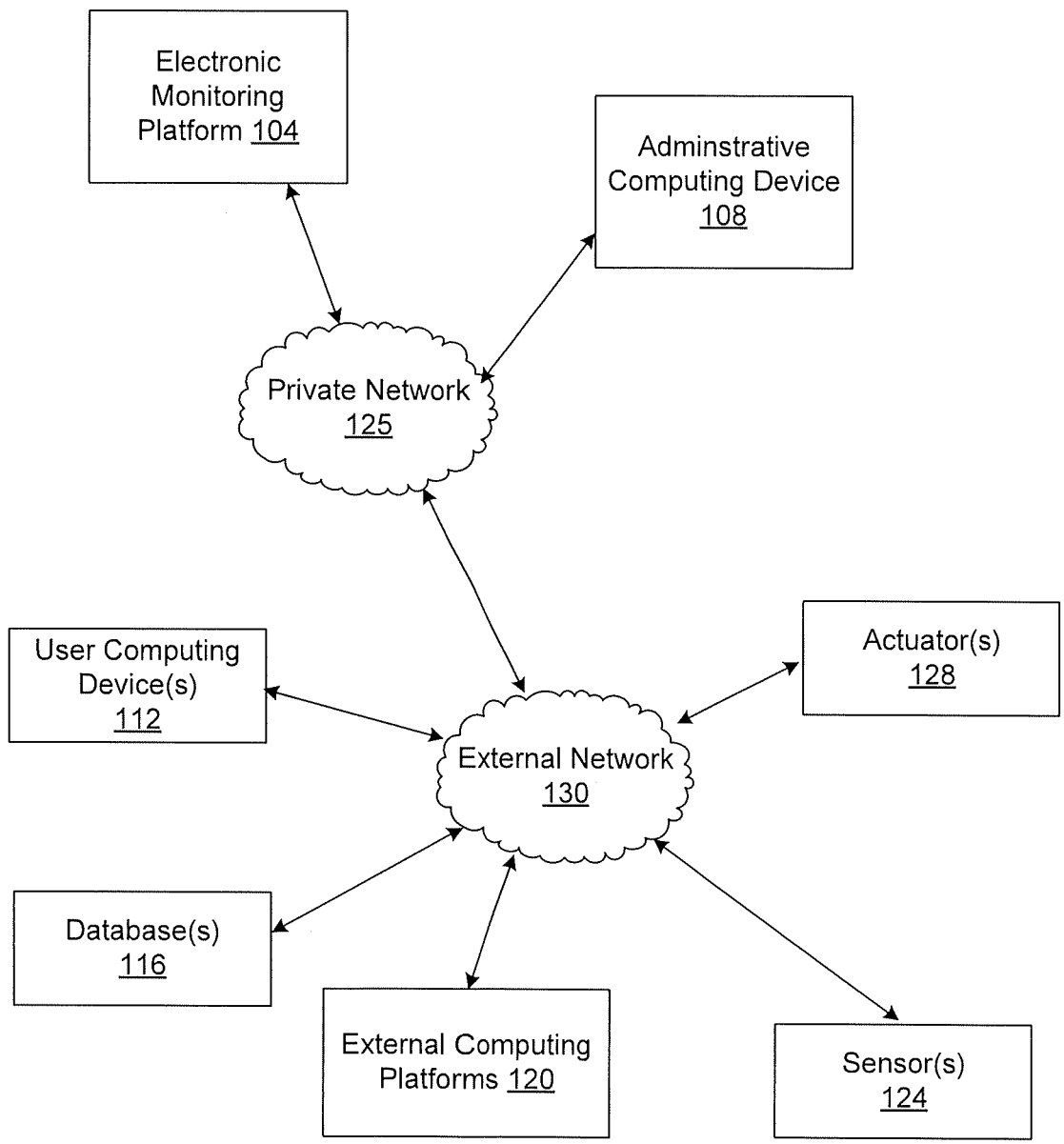
FIG. 1A shows an illustrative computing environment for electronic monitoring and securing of physical locations, in accordance with one or more example arrangements.

FIG. 1A shows an illustrative computing environment 100 for electronic monitoring, in accordance with one or more arrangements. The computing environment 100 may comprise one or more devices (e.g., computer systems, communication devices, and the like). The computing environment 100 may comprise, for example, an electronic monitoring platform 104, an administrative computing device 108, one or more user computing devices 112, one or more databases 116, external computing platforms 120, one or more sensors 124, and/or one or more actuators 128. The electronic monitoring platform 104 and the administrative computing device 108 may be linked over a private network 125 associated with an enterprise organization providing security services to one or more physical locations (e.g., retail banking physical locations, buildings, offices, public facilities, etc.). While specific examples recited herein may be refer to monitoring and securing retail banking physical locations (e.g., retail banking facilities, automatic teller machine (ATM) centers, etc.), the various example systems, methods, and apparatuses may be used for securing any other type of physical location.

The one or more user computing devices 112, one or more databases 116, external computing platforms 120, one or more sensors 124, and/or one or more actuators 128 may be connected, via an external network 130 (e.g., a public network), to the devices in the private network 125. The devices in the computing environment 100 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), etc.).

The electronic monitoring platform 104 may comprise one or more computing devices and/or other computer components (e.g., processors, memories, communication interfaces) configured to perform one or more functions as described herein. As further described herein, the electronic monitoring platform 104 may use an AI engine to detect anomalous patterns (e.g., anomalous movement pattern of individuals at a physical location and/or anomalous sensor measurements). The electronic monitoring platform may send one or more alert notifications based on detection of anomalous patterns. Further details associated with the architecture of the electronic monitoring platform 104 are described with reference to FIG. 1B.

The administrative computing device 108 may be a personal computing device (e.g., desktop computer, laptop computer) or mobile computing device (e.g., smartphone, tablet) associated with user who may have administrative privileges within the private network. For example, the administrative computing device 108 may be used to monitor the operation of and provide commands for execution at the electronic monitoring platform 104 and/or other devices connected via the external network 130.

The user computing device(s) 112 may be a personal computing device (e.g., desktop computer, laptop computer) or mobile computing device (e.g., smartphone, tablet). A user computing device 112 may be linked to and/or operated by a specific a user (who may, for example, located at a physical location serviced by the electronic monitoring platform 104). The user computing device(s) 112 may be configured to receive alert notifications from the electronic monitoring platform 104. In an arrangement, if the physical location corresponds to a banking facility, the user computing device 112 may correspond to a computing device providing teller services at the banking facility and the user computing device 112 may disconnect itself from the banking network based on the alert notification. In an arrangement, the user computing device(s) 112 may be associated with security personnel at the physical location and the alert notification may comprise information (e.g., a photograph) associated with an individual potentially exhibiting anomalous movement patterns.

The external computing platforms 120 may correspond to external agencies that the electronic monitoring platform 104 may interact with to exchange information. In an arrangement, the external computing platform 120 may comprise a computing device (e.g., a server) associated with a weather forecasting service (e.g., national weather service (NWS)) which may provide weather related information (e.g., atmospheric conditions/heat/cold, precipitation, etc.) for a geographical area (e.g., a city) corresponding to the physical locations being monitored by the electronic monitoring platform. As further described herein, the electronic monitoring platform 104 may use this information to detect anomalous dressing patterns of individuals at the physical locations.

The one or more sensors 124 may correspond to audio capturing equipment, video capturing equipment, gas sensors, building stress sensors, scanners (e.g., millimeter wave scanners), and/or any other type of sensors located at the physical locations being monitored by the electronic monitoring platform 104. The gas sensors 124 may correspond to one or more of electrochemical gas sensors, gas chromatographs, ion-mobility spectrometers, surface acoustic wave sensors, spectrophotometric sensors, chemiresistive gas sensors. The gas sensors 124 may be configured to measure one or more target gases (e.g., vapors from explosive materials/gunpowder, smoke, etc.).

The one or more actuators 128 may correspond to locking mechanisms associated with doors and/or vaults located at the physical locations being monitored by the electronic monitoring platform 104. The one or more actuators 128 may cause the locking mechanisms to engage or disengage based on signals received from the electronic monitoring platform 104, the administrative computing device 108, and/or the user computing device 112. The one or more actuators 128 may be associated with switches for controlling electric equipment (e.g., fans, heating, ventilation and air conditioning (HVAC) systems) at the physical locations being monitored by the electronic monitoring platform 104. The one or more actuators 128 may cause the switches to engage/disengage (turn on/off) based on signals received from the electronic monitoring platform 104, the administrative computing device 108, and/or the user computing device 112. The one or more actuators 128 may be associated with regulators for controlling rotational speeds of the fans at the physical locations being monitored by the electronic monitoring platform 104. The one or more actuators 128 may cause the regulators to increase or decrease rotational speeds of the fans based on signals received from the electronic monitoring platform 104, the administrative computing device 108, and/or the user computing device 112.

The database(s) 116 may correspond to law enforcement agencies and may store information associated with individuals on a watchlist. For example, the database(s) 116 may comprise photographs of individuals on a watchlist which may be referenced by the electronic monitoring platform 104 to identify specific individuals at a physical location. In an arrangement, the database(s) 116 may correspond to stored data from sensor(s) 124 (e.g., stored audio/video recordings, gas sensor measurements, building stress sensor measurements, millimeter wave scanner measurements, etc.) that may be used to generate AI models for detection of anomalies or anomalous patterns. The database(s) 116 may store data from a plurality of physical locations being monitored by the electronic monitoring platform 104. As such, captured data from sensors in multiple locations may be used to train AI models.

In one or more arrangements, the electronic monitoring platform 104, the administrative computing device 108, the user computing devices 112, the external computing platforms 120, and/or other devices/systems in the computing environment 100 may be any type of computing device capable of receiving input via a user interface, and communicating the received input to one or more other computing devices in the computing environment 100. For example, the electronic monitoring platform 104, the administrative computing device 108, the user computing devices 112, the external computing platforms 120, and/or other devices/systems in the computing environment 100 may, in some instances, be and/or include server computers, desktop computers, laptop computers, tablet computers, smart phones, wearable devices, or the like that may comprised of one or more processors, memories, communication interfaces, storage devices, and/or other components. Any and/or all of the electronic monitoring platform 104, the administrative computing device 108, the user computing devices 112, the external computing platforms 120, and/or other devices/systems in the computing environment 100 may, in some instances, be and/or comprise special-purpose computing devices configured to perform specific functions.

Figure 1B:
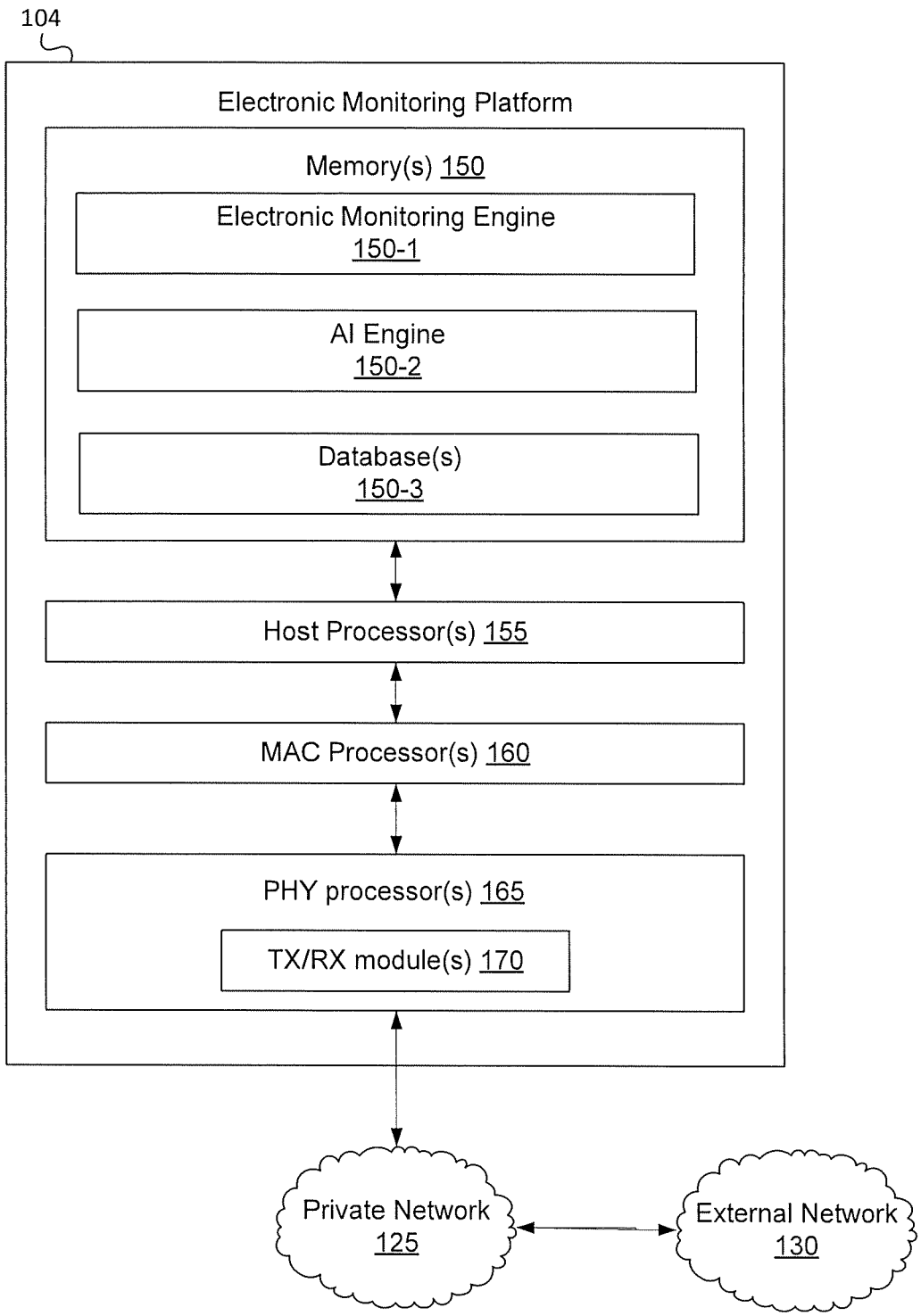
FIG. 1B shows an example electronic monitoring platform, in accordance with one or more example arrangements.

FIG. 1B shows an example electronic monitoring platform 104 in accordance with one or more examples described herein. The electronic monitoring platform 104 may comprise one or more of host processor(s) 155, medium access control (MAC) processor(s) 160, physical layer (PHY) processor(s) 165, transmit/receive (TX/RX) module(s) 170, memory 150, and/or the like. One or more data buses may interconnect host processor(s) 155, MAC processor(s) 160, PHY processor(s) 165, and/or Tx/Rx module(s) 170, and/or memory 150. The electronic monitoring platform 104 may be implemented using one or more integrated circuits (ICs), software, or a combination thereof, configured to operate as discussed below. The host processor(s) 155, the MAC processor(s) 160, and the PHY processor(s) 165 may be implemented, at least partially, on a single IC or multiple ICs. Memory 150 may be any memory such as a random-access memory (RAM), a read-only memory (ROM), a flash memory, or any other electronically readable memory, or the like.

Messages transmitted from and received at devices in the computing environment 100 may be encoded in one or more MAC data units and/or PHY data units. The MAC processor(s) 160 and/or the PHY processor(s) 165 of the electronic monitoring platform 104 may be configured to generate data units, and process received data units, that conform to any suitable wired and/or wireless communication protocol. For example, the MAC processor(s) 160 may be configured to implement MAC layer functions, and the PHY processor(s) 165 may be configured to implement PHY layer functions corresponding to the communication protocol. The MAC processor(s) 160 may, for example, generate MAC data units (e.g., MAC protocol data units (MPDUs)), and forward the MAC data units to the PHY processor(s) 165. The PHY processor(s) 165 may, for example, generate PHY data units (e.g., PHY protocol data units (PPDUs)) based on the MAC data units. The generated PHY data units may be transmitted via the TX/RX module(s) 170 over the private network 155. Similarly, the PHY processor(s) 165 may receive PHY data units from the TX/RX module(s) 165, extract MAC data units encapsulated within the PHY data units, and forward the extracted MAC data units to the MAC processor(s). The MAC processor(s) 160 may then process the MAC data units as forwarded by the PHY processor(s) 165.

One or more processors (e.g., the host processor(s) 155, the MAC processor(s) 160, the PHY processor(s) 165, and/or the like) of the electronic monitoring platform 104 may be configured to execute machine readable instructions stored in memory 150. The memory 150 may comprise (i) one or more program modules/engines having instructions that when executed by the one or more processors cause the electronic monitoring platform 104 to perform one or more functions described herein and/or (ii) one or more databases that may store and/or otherwise maintain information which may be used by the one or more program modules/engines and/or the one or more processors. The one or more program modules/engines and/or databases may be stored by and/or maintained in different memory units of the electronic monitoring platform 104 and/or by different computing devices that may form and/or otherwise make up the electronic monitoring platform 104. The electronic monitoring engine 150-1 may have instructions that direct and/or cause the electronic monitoring platform 104 to perform one or more operations of the electronic monitoring platform 104 as discussed herein.

The AI engine 150-2 may receive data and, using one or more machine learning algorithms, may generate one or more machine learning datasets (e.g., AI models). Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. As further described herein, the machine learning algorithms and generated AI models may be used for determining anomalies in sensor data, movement patterns of individuals, or any other type of data that may be used for determining potential security threats at the physical location.

The database 150-3 may stored information that may be accessed by the electronic monitoring platform 104 for analysis (e.g., by the AI engine 150-2). For example, the database 150-3 may store a record of individuals who have visited a physical location, number of times that the individuals have visited, whether the individual is associated with the physical location (e.g., a client or an employee), etc. The database 150-3 may store other archived information received from the sensors 124. The archived information may be used for training AI models for detection of anomalies.

While FIG. 1A illustrates the electronic monitoring platform 104 and the administrative computing device 108 as being separate elements connected in the private network 125, in one or more other arrangements, functions of one or more of the above may be integrated in a single device/network of devices. For example, elements in the electronic monitoring platform 104 (e.g., host processor(s) 155, memory(s) 150, MAC processor(s) 160, PHY processor(s) 165, TX/RX module(s) 170, and/or one or more program/modules stored in memory(s) 150) may share hardware and software elements with and corresponding to, for example, administrative computing device 108.

While various examples herein may relate to a centralized electronic monitoring platform 104 monitoring multiple physical locations/facilities, in an arrangement the electronic monitoring platform 104 may only monitor a single physical location and/or may be located at the physical location. In some such examples, the electronic monitoring platform 104 may be connected to other devices at the physical location (e.g., user computing devices, sensors, actuators, etc.) via a private network. Further, while various examples herein may relate to monitoring and securing a retail banking physical location/facility, the described systems, methods, and devices may be used for any other type of physical location (e.g., public or private buildings, concert halls, shopping malls, offices, etc.).

Figure 2:
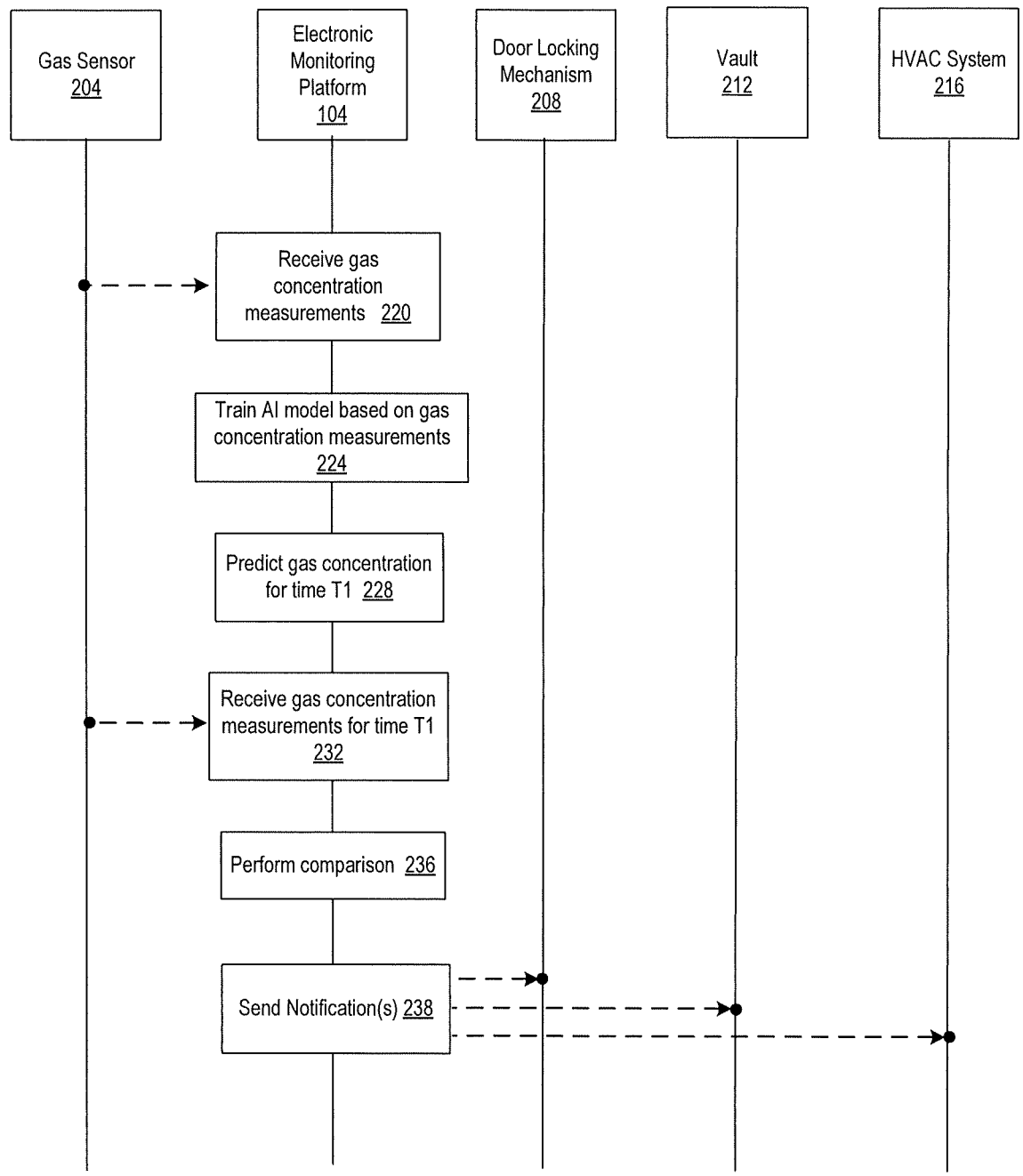
FIG. 2 shows an illustrative event sequence for securing a physical location based on machine learning-based monitoring of gas sensor measurements, in accordance with one or more example arrangements.

FIG. 2 shows an illustrative event sequence for securing a retail banking physical location based on machine learning-based monitoring of gas sensor measurements. At step 220, the electronic monitoring platform 104 may receive, from a gas sensor 204, gas concentration measurements corresponding to a plurality of target gases. The gas sensor 204 may be an electrochemical gas sensor, a gas chromatograph, an ion-mobility spectrometer; a surface acoustic wave sensor, a spectrophotometric sensor, a chemiresistive gas sensor or any other type of gas sensor. The target gases may correspond to one or more of: vapors associated with explosive materials, gunpowder residue, smoke (e.g., suspended particulate matter in air), etc. The gas concentration measurements may correspond to measurements obtained at a plurality of times (e.g., a plurality of time instances). While the event sequence of FIG. 2 is described with reference to measurements obtained from a single gas sensor 204, in other arrangements, the retail banking physical location may be equipped with a plurality of gas sensors. In an arrangement where a plurality of gas sensors is used, each gas sensor may be configured for detection of specific target gas/gases.

At step 224, the electronic monitoring platform 104 may train an AI model based on the received gas concentration measurements. The electronic monitoring platform 104 may train the AI model using any supervised or non-supervised machine learning algorithms. The AI model may be based on a logistic regression algorithm, a decision tree algorithm, a random forest algorithm, a neural network algorithm, a support vector machine algorithm, a clustering algorithm, and/or any other type of machine learning algorithm. In an arrangement, the training data (e.g., gas concentration measurements) may be received from the database 116 which may store measured data obtained from a plurality of physical locations and/or a plurality of gas sensors.

The AI model may be used to identify anomalous gas concentration measurements determined by the gas sensor 204 for any future time. For example, the electronic monitoring platform 104 may train a recurrent neural network based on the received gas concentration measurements from the gas sensor 204 and predict, based on the recurrent neural network, future gas concentrations. The electronic monitoring platform 104 may determine anomalies based on predictions made by the recurrent neural network and actual measured gas concentrations. In an arrangement in which the retail banking physical location may be equipped with a plurality of gas sensors, the electronic monitoring platform 104 may determine an AI model for each gas sensor separately, or may generate a single AI model based on average gas concentration measurements obtained from the plurality of gas sensors.

At step 228, and based on the AI model, the electronic monitoring platform 104 may predict/determine gas concentrations for the plurality of target gases for a time (e.g., a future time instance T1). At step 232, the electronic monitoring platform 104 may receive, from the gas sensor 204, gas concentration measurements for the plurality of target gases for the time T1. At step 236, the electronic monitoring platform 104 may compare the predicted gas concentrations for the time T1 with the measured gas concentrations for the time T1. If a received gas concentration measurement for a target gas is different from (e.g., exceeds) a predicted gas concentration measurement for the target gas, the target gas may be flagged as having an anomalous gas concentration. If a received gas concentration measurement for a target gas exceeds a predicted gas concentration measurement for the target gas by a threshold value, the target gas may be flagged as having an anomalous gas concentration. The threshold value may be a multiple of a standard deviation of measured concentrations of the target gas.

At step 238, the electronic monitoring platform 104 may send notification(s) to one or more actuators 128 based on determining that a target gas has an anomalous gas concentration. For example, the electronic monitoring platform 104 may send a notification to a door locking mechanism 208 associated with a door at the retail banking physical location. Based on receiving the notification, the door locking mechanism 208 may be engaged and lock the door. As another example, the electronic monitoring platform 104 may send a notification to a vault 212 (e.g., a locking mechanism of the vault 212). Based on receiving the notification, the locking mechanism may be engaged and lock the vault 212. As another example, the electronic monitoring platform 104 may send a notification to an HVAC system 216 (e.g., a controller associated with the HVAC system 216). Based on receiving the notification, the controller may change (e.g., increase) a rotational speed of a fan in the vicinity of the gas sensor 204. This may enable the system to dilute any target gases that may have been flagged as showing anomalous concentrations (e.g., at step 236). In an arrangement, the electronic monitoring platform 104 may send an alert notification to one or more computing devices (e.g., a user computing device 112) based on determining that a target gas has an anomalous gas concentration.

In an arrangement, the gas sensor 204 may be located near an entrance of the retail banking physical location. In accordance with the event sequence of FIG. 2, the electronic monitoring platform 104 may lock the entrance door to the retail banking physical location if an anomalous gas concentration is measured. In an arrangement, the gas sensor 204 may be co-located with a fan configured to pull-in air from its surroundings. The fan may enable the gas sensor 204 to analyze a larger volume of air.

While the above example describes determination of anomalies based on a comparison between predicted and measured gas concentrations, other AI-based techniques may be used. For example, the electronic monitoring platform 104 may use a clustering algorithm to determine/group normal gas concentration measurements among the received gas concentration measurements (e.g., received at step 220). The clustering algorithm may comprise one or more of hierarchical clustering, centroid based clustering, density based clustering, and/or distribution based clustering. Any future gas concentration measurements that fall outside of this group may be determined as anomalous. For example, a future gas concentration measurement may be determined to be outside a group if the distance(s) between the measurement and core point(s) associated with the group is/are greater than a threshold value.

In another arrangement, the AI model may be trained, based on supervised machine algorithms, to identify anomalous gas concentration measurements. For example, the gas concentration measurements received at step 220 may analyzed by an administrator (e.g., associated with the administrative computing device 108). The administrator may tag the gas concentration measurements as anomalous or not anomalous based on manual review. The AI model may be a neural network that may be trained based on the tags and the gas concentration measurements received at step 220. The electronic monitoring platform 104 may use the trained AI model to determine whether future gas concentration measurements (e.g., gas concentration measurements received at time T1) are anomalous.

Figure 3:
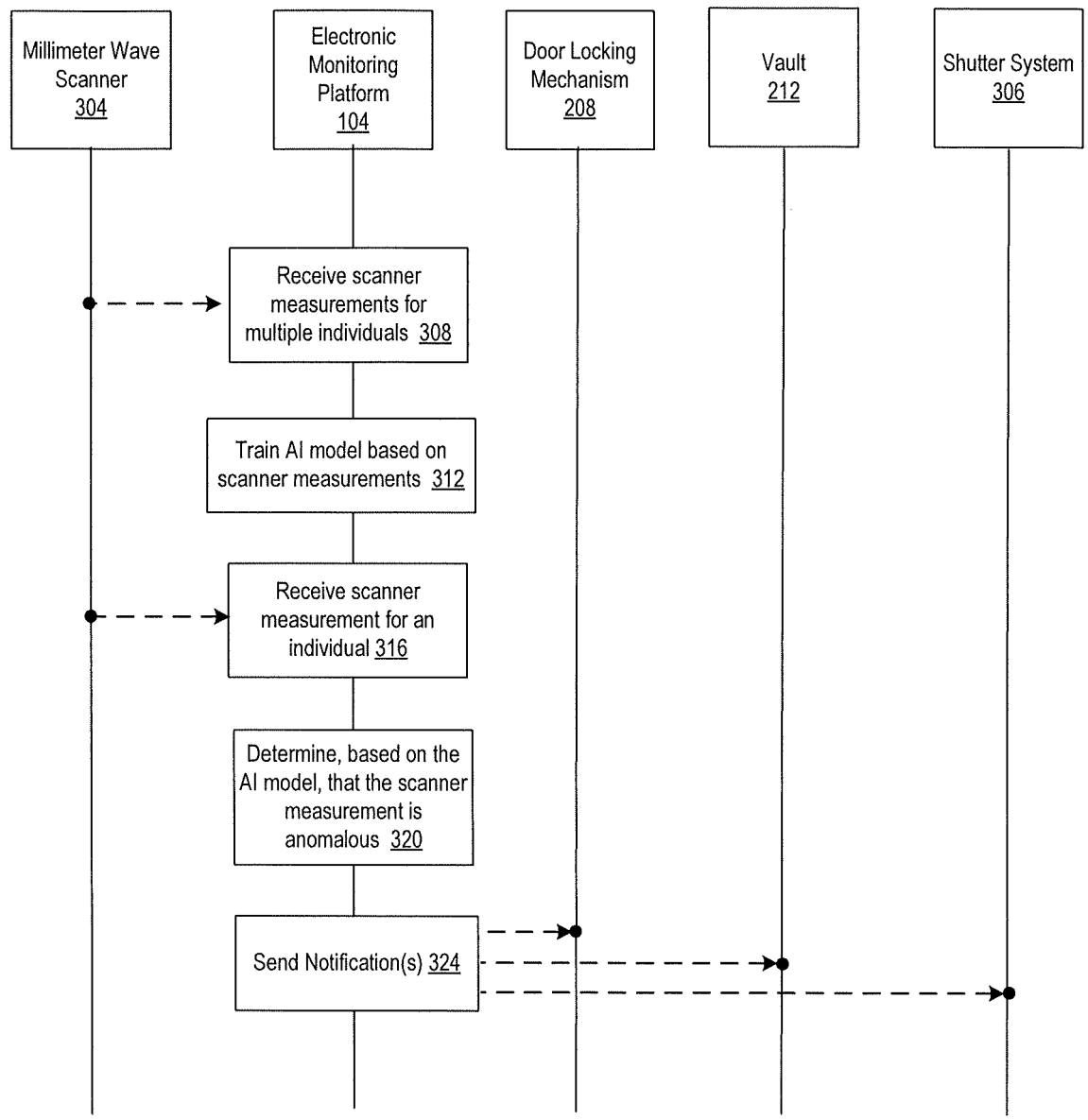
FIG. 3 shows an illustrative event sequence for securing a physical location based on machine learning-based monitoring of millimeter wave scanner measurements, in accordance with one or more example arrangements.

FIG. 3 shows an illustrative event sequence for securing a retail banking physical location based on machine learning-based monitoring of millimeter wave scanner measurements. One or more millimeter wave scanners 304 may be configured to analyze individuals at the retail banking physical location and determine any concealed objects they might be carrying (e.g., concealed in clothing, a bag, etc.). The concealed objects may be metallic or non-metallic. While the examples herein describe the user of a millimeter wave scanner, any other type of sensor system that may perform remote scanning for detecting concealed objects and/or metallic objects may be used for this purpose.

At step 308, the electronic monitoring platform 104 may receive, from the millimeter wave scanner 304, measurements corresponding to a plurality of individuals. The measurements may correspond to sizes and locations of concealed objects associated with the individual. For example, a size may correspond to dimensions associated with a concealed object was detected by the millimeter wave scanner 304. A location may correspond to a location where a concealed object was detected by the millimeter wave scanner 304 (e.g., a pocket, a purse, backpack, etc.). The electronic monitoring platform 104 may use the received measurements as training data for training an AI model for identifying anomalous measurements. In an arrangement, the training data may be received from the database 116 which may store measurement data obtained from a plurality of physical locations.

At step 312, the electronic monitoring platform 104 may train an AI model to identify anomalous measurements. For example, the electronic monitoring platform 104 may use a clustering algorithm to determine/group normal measurements among the received measurements corresponding to the plurality of individuals (e.g., received at step 308). The clustering algorithm may comprise one or more of hierarchical clustering, centroid based clustering, density based clustering, and/or distribution based clustering. Grouping of normal measurements may enable the electronic monitoring platform 104 to categorize measurement data that corresponds to objects that may be generally be carried by individuals (e.g., cellphones, watches, wallets, jewelry, etc.) as normal and non-anomalous.

At step 314, the electronic monitoring platform 104 may receive a millimeter wave scanner measurement corresponding to an individual. At step 320, the electronic monitoring platform 104 may determine whether the millimeter wave scanner measurement (e.g., a determined size/location of a concealed object) corresponding to the individual is anomalous. The millimeter wave scanner measurement may be determined to be anomalous, for example, if the measurement falls outside a group determined by the clustering algorithm. For example, the measurement may be determined to be outside the group if the distance(s) between the measurement and core point(s) associated with the group is/are greater than a threshold value.

At step 324, the electronic monitoring platform 104 may send notification(s) to one or more actuators 128 based on determining that the millimeter wave scanner measurement corresponding to the individual is anomalous. For example, the electronic monitoring platform 104 may send a notification to a door locking mechanism 208 associated with a door at the retail banking physical location. Based on receiving the notification, the door locking mechanism 208 may be engaged and lock the door. As another example, the electronic monitoring platform 104 may send a notification to a vault 212 (e.g., a locking mechanism of the vault 212). Based on receiving the notification, the locking mechanism may be engaged and lock the vault. As another example, the electronic monitoring platform 104 may send a notification to a shutter system 306 (e.g. controlling a shutter at a teller window). Based on receiving the notification, the shutter system 306 may activate a shutter at the teller window (e.g., cause the shutter to close). In an arrangement, the electronic monitoring platform 104 may send an alert notification to one or more computing devices (e.g., a user computing device 112) based on determining that the millimeter wave scanner measurement corresponding to the individual is anomalous.

In an arrangement, other measurements associated with an individual may be used for grouping by the clustering algorithm. For example, the physical location may comprise one or more video cameras that may record individuals at the physical location. An AI engine (e.g., using a convolutional neural network) at the electronic monitoring platform 104 may analyze recordings from the video cameras and determine gaits, paces, and postures associated with the individuals at the physical location. The clustering algorithm may group measurements obtained from the millimeter wave scanner 304, the determined gaits, the determined paces, and the determined postures. Based on the grouping, the electronic monitoring platform 104 may determine normal characteristics (e.g., sizes/locations of concealed objects, gaits, paces, postures, etc.) associated with individuals at the physical location. The electronic monitoring platform 104 may send notifications (e.g., to one or more actuators 128, a user computing device 112, or an administrative computing device 108) based on determining that characteristics associated with an individual (e.g., sizes/locations of concealed objects, gait, pace, posture, etc.) are anomalous (e.g., is outside a group determined by the grouping algorithm).

In an arrangement, the electronic monitoring platform 104 may use any other machine learning algorithm to train an AI model and identify whether an individual is showing anomalous characteristics. For example, the AI model may be trained, based on supervised machine algorithms, to identify anomalous characteristics. The scanner measurements received at step 308 (and/or recordings from the video cameras) may be analyzed by an administrator to determine whether characteristics associated with an individual are anomalous or not anomalous. At step 312, the AI model may be trained based on the user determination and scanner measurements (and/or recordings from the video cameras). At step 320, the electronic monitoring platform 104 may use the trained AI model to determine whether an individual is showing anomalous characteristics (e.g., anomalous concealed object, gait, pace, posture, etc.).

Figure 4:
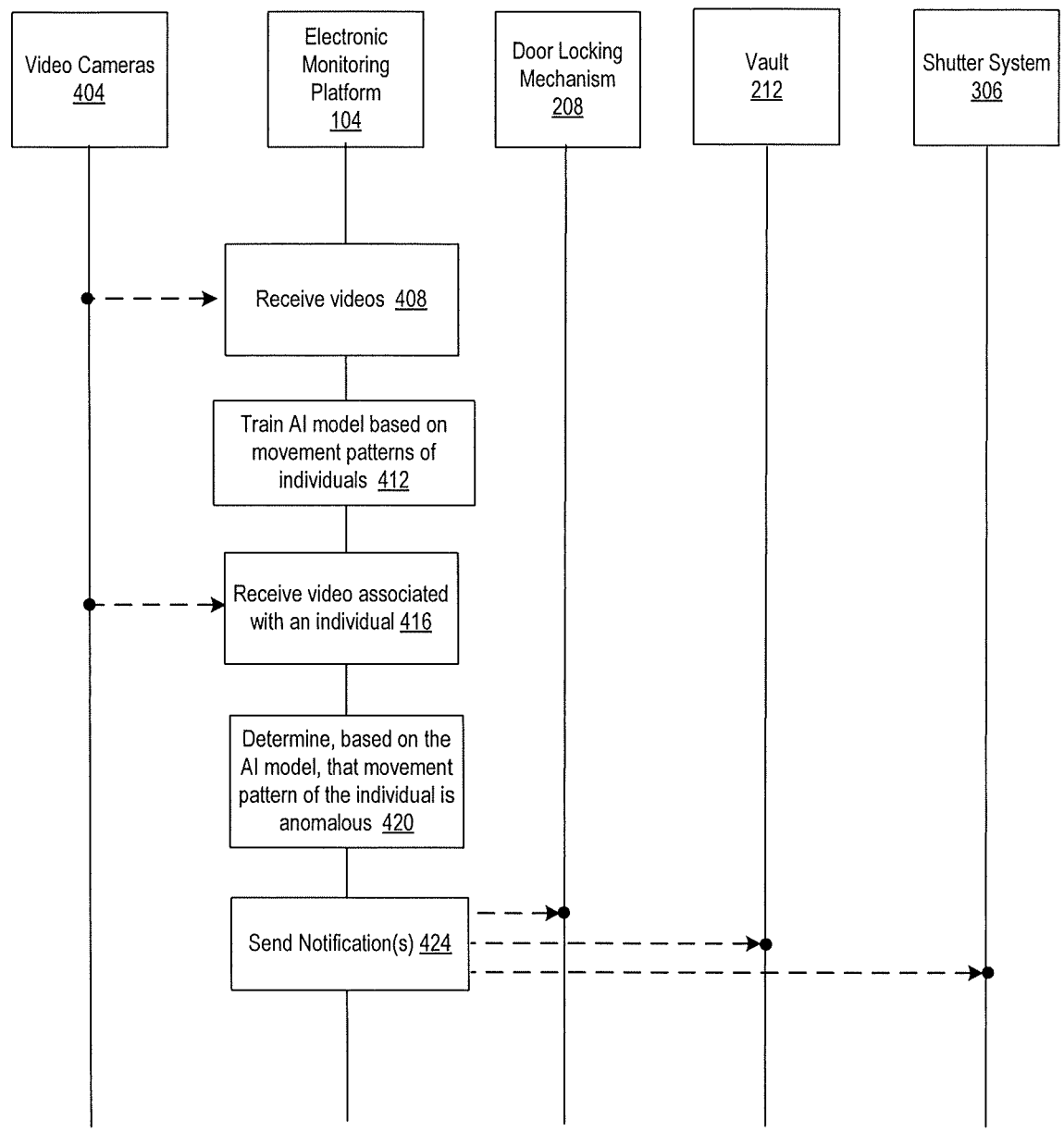
FIG. 4 shows an illustrative event sequence for securing a physical location based on machine learning-based monitoring of video footage, in accordance with one or more example arrangements.

FIG. 4 shows an illustrative event sequence for securing a retail banking physical location based on machine learning-based monitoring of video footage. One or more video cameras 404 may be configured to record videos at the retail banking physical location and send the videos (e.g., step 408) to the electronic monitoring platform 104. An AI engine (e.g., using a convolutional neural network, generative adversarial network, or any other type of machine learning algorithm) associated with the electronic monitoring platform 104 may analyze recordings from the video cameras and determine movement patterns (e.g., gaits, paces, and postures) associated with the individuals at the physical location.

At step 412, the electronic monitoring platform 104 may train, based on the determined movement patterns and/or the videos, an AI model for identifying anomalous movement patterns. The AI model may be trained based on supervised machine learning or unsupervised machine learning. In unsupervised machine learning, for example, a clustering algorithm may used to group normal movement patterns. The clustering algorithm may comprise hierarchical clustering, centroid based clustering, density based clustering, and/or distribution based clustering. In supervised machine learning, a user (e.g., associated with the administrative computing device 108) may analyze the videos (or the determined movement patterns) and determine whether a movement pattern associated with an individual is anomalous or not anomalous (or normal). The AI model may be trained based the determined movement patterns and user determination of normal/anomalous movement patterns.

At step 416, the electronic monitoring platform 104 may receive one or more videos (e.g., test videos). The electronic monitoring platform 104 may determine (e.g., using an AI engine) a movement pattern (e.g., gait, pace, and/or posture) associated with an individual based on the one or more videos. At step 420, the electronic monitoring platform 104 may determine, based on the AI model, whether the movement pattern is anomalous.

At step 424, the electronic monitoring platform 104 may send notification(s) to one or more actuators 128 based on determining that the movement pattern corresponding to the individual is anomalous. For example, the electronic monitoring platform 104 may send a notification to a door locking mechanism 208 associated with a door at the retail banking physical location. Based on receiving the notification, the door locking mechanism 208 may be engaged and lock the door. As another example, the electronic monitoring platform 104 may send a notification to a vault 212 (e.g., a locking mechanism of the vault 212). Based on receiving the notification, the locking mechanism may be engaged and lock the vault. As another example, the electronic monitoring platform 104 may send a notification to a shutter system 306 (e.g. controlling a shutter at a teller window). Based on receiving the notification, the shutter system 306 may activate a shutter at the teller window (e.g., cause the shutter to close). In an arrangement, the electronic monitoring platform 104 may send an alert notification to one or more computing devices (e.g., a user computing device 112) based on determining that the movement pattern corresponding to the individual is anomalous.

In an arrangement, the AI model may be trained based on or more other characteristics associated with the user. For example, the AI engine may further determine micro expressions associated with the individuals in the physical location (e.g., based on received videos). The electronic monitoring platform 104 may train the AI model, based on the determined micro expressions, to identify anomalous micro expressions (e.g., using supervised or unsupervised machine learning, as described above with respect to FIG. 4). The electronic monitoring platform 104 may identify anomalous micro expressions exhibited by an individual in a manner similar to as described above with respect to FIG. 4. The electronic monitoring platform 104 may send notification to one or more devices in the network based on determining anomalous movement patterns and/or micro expressions.

As another example, the electronic monitoring platform 104 may further determine words/phrases spoken by the individuals in the physical location (e.g., based on received videos or audio). The electronic monitoring platform 104 may train the AI model, based on the determined words/phrases, to identify anomalous words/phrases (e.g., using supervised or unsupervised machine learning, as described above with respect to FIG. 4). The AI model may then be used to identify anomalous words/phrases spoken by an individual in a manner similar to as described above with respect to FIG. 4. The electronic monitoring platform 104 may send notification to one or more devices in the network based on determining anomalous movement patterns, micro expressions, and/or spoken words/phrases.

In an arrangement, the AI model may be trained to identify clients associated with the retail banking enterprise organization. For example, clients associated with the retail bank may have similar path patterns within the retail banking physical location. A client may first approach a teller counter after entering the retail banking physical location, approach an automatic teller machine (ATM), approach a desk that has various forms that may be used for accessing banking services, etc. The AI model may be trained (e.g., using supervised machine learning, or unsupervised machine learning) to identify these path patterns based on videos received from one or more video cameras 404 (e.g., in a manner similar to as described with respect to FIG. 4). The electronic monitoring platform 104 may use the trained AI model to identify clients associated with the retail banking facility and flag individuals with anomalous path patterns (e.g., a loitering pattern). The electronic monitoring platform 104 may send notifications to one or more devices in the network based on identifying individuals with anomalous path patterns.

In an arrangement, the electronic monitoring platform 104 may use a database associated with a law enforcement agency (e.g., the database 104) and compare images of individuals at the retail banking physical location with images stored in the database. For example, the electronic monitoring platform 104 may use a convolutional neural network to determine potential matches in the database and send notifications to one or more one or more devices in the network (e.g., in a manner similar to as described with respect to FIG. 4).

In an arrangement, the AI model may be trained to correlate dressing pattern of an individual with weather reports obtained from a server associated with a weather forecasting service. An AI engine associated with the electronic monitoring platform may analyze videos from the video cameras 404 to identify clothing/accessories being worn by an individual (e.g., using a convolutional neural network). The AI model may be trained (e.g., using supervised or unsupervised machine learning algorithms) to correlate a clothing worn by individuals to weather reports at a geographical area corresponding to the retail banking physical location. The AI model may then be used to identify anomalous dressing pattern of an individual and send notifications to one or more one or more devices in the network (e.g., in a manner similar to as described with respect to FIG. 4). For example, an anomalous dressing pattern may comprise wearing of a jacket on a warm day, sunglasses on a cloudy day, etc.

In an arrangement, the electronic monitoring platform 104 may store images (e.g., in database 150-3) associated with individuals who visit the retail banking physical location (e.g., as obtained from the video cameras 404). The electronic monitoring platform 104 may track a quantity of times that the individual may have visited the retail banking physical location (e.g., by using an image recognition algorithm to correlate newly obtained images with stored images). The electronic monitoring platform 104 may send notifications to one or more one or more devices in the network (e.g., in a manner similar to as described with respect to FIG. 4) if a quantity of times (e.g., in a predetermined time interval) exceeds a threshold quantity.

In an arrangement, the electronic monitoring platform 104 may initiate recording and/or flagging of videos from video cameras located external to the retail banking physical location (e.g., a parking lot, stairwell, rooftop) based on detection of an anomaly (e.g., based on one or more criteria described herein) at the retail banking physical location. The electronic monitoring platform 104 may use an AI engine and/or an image recognition algorithm to identify a vehicle in the parking lot used by an individual who may have shown anomalous characteristics (e.g., anomalous concealed objects, movement patterns, dressing patterns, path patterns, etc.). The electronic monitoring platform 104 may capture and store license plate information (e.g., in the database 150-3) of the vehicle for future review.

In an arrangement, a retail banking physical location may comprise restricted areas (e.g., vault room, corporate offices, etc.). The electronic monitoring platform 104 may monitor videos from the video cameras 404 associated with the restricted areas and determine whether any individual in a video is an unauthorized individual. For example, the database 150-3 may store photographs of authorized individuals and the electronic monitoring platform 104 may determine (e.g., using a convolutional neural network, a generative adversarial network (GAN), or any other image recognition algorithm) whether an individual in the video does not match any of the photographs of authorized individuals. The electronic monitoring platform 104 may send notifications to one or more one or more devices in the network (e.g., in a manner similar to as described with respect to FIG. 4) if an individual in the video does not match any of the photographs of authorized individuals.

In an arrangement, the electronic monitoring platform 104 may receive signals obtained from stress sensors located in the retail banking physical location. The electronic monitoring platform 104 may generate an AI model based on measurements from the stress sensors over a period of time. Anomalies in any future stress sensor measurements may be determined by the AI model and appropriate notifications may be sent to one or more devices in the network. An anomalous stress measurement may correspond to an attempt to break into the retail banking physical location.

Any of the anomalies detected herein (e.g., as described with respect to FIGS. 2-5) may be considered as a precursor for a future malicious act. For example, detection of anomalous movement patterns, dressing patterns, path patterns, etc. may be considered as potential indication of the individual monitoring the retail banking physical location for a (future) malicious activity. Sending one or more notifications based on detection of an anomaly may enable initiation of appropriate remedial measures prior to occurrence of the malicious act. The various examples described herein may also operate in an inconspicuous manner (e.g., by not requiring security personnel) thereby preventing the individual from being alerted. Further, AI-based monitoring of sensor measurements and triggering of remedial measures may reduce manual effort required for monitoring and securing a physical location.

Figure 5:
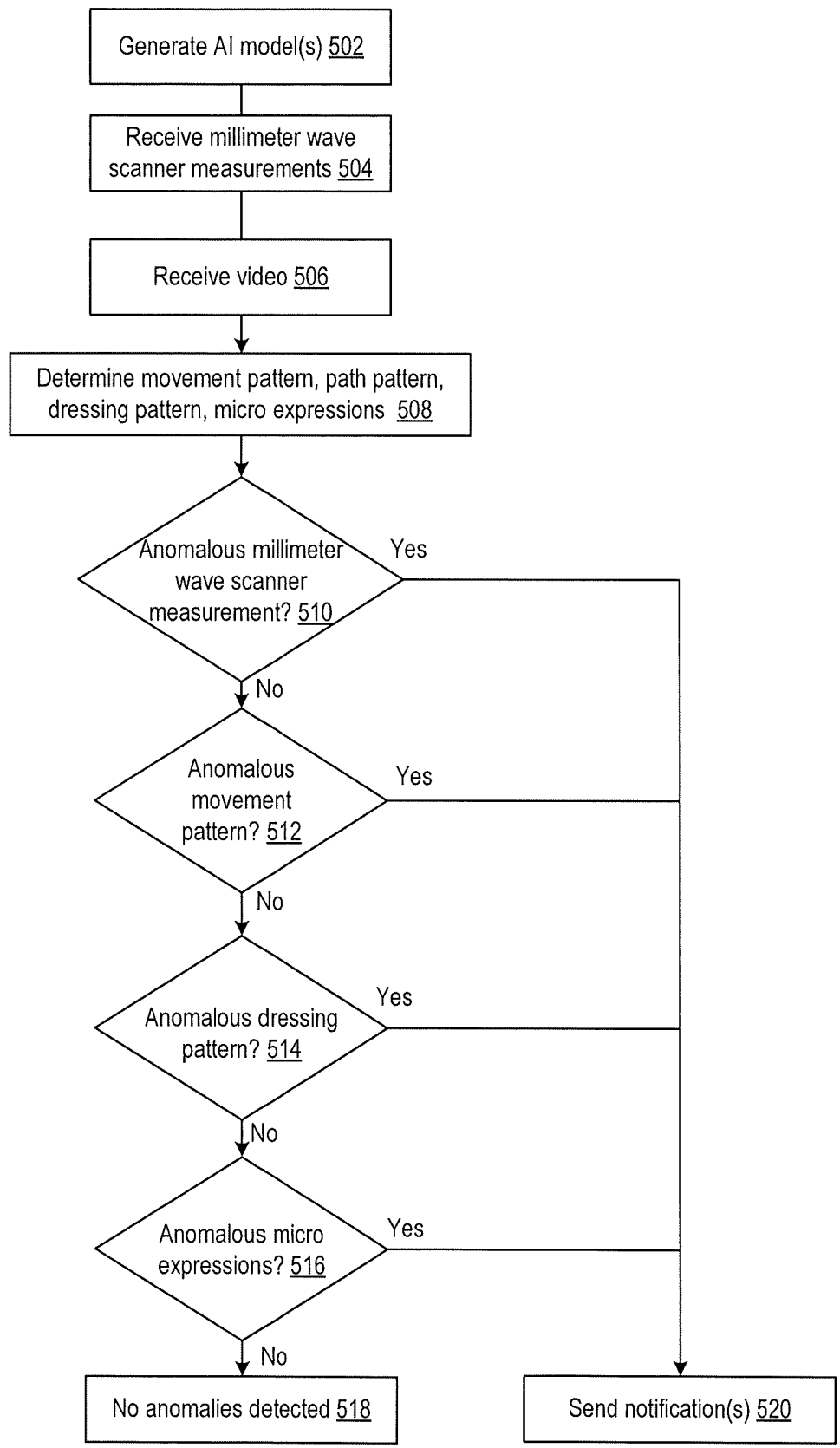
FIG. 5 shows an example algorithm for detecting an anomaly at a physical location based on measurements received from one or more sensors, in accordance with one or more example arrangements.

FIG. 5 shows an example algorithm for detecting an anomaly at a physical location based on measurements received from one or more sensors. At step 502, the electronic monitoring platform may generate one or more AI models based on data received from one or more sensors (e.g., millimeter wave scanners, video cameras, etc.) or from a database storing historical information received from the sensors. The one or more AI models may be generated based on supervised or unsupervised machine learning algorithms. For example, an AI model may be trained to identify anomalous millimeter wave scanner measurements, an AI model may be trained to identify anomalous movement patterns, an AI model may be trained to identify anomalous dressing patterns, an AI model may be trained to identify anomalous path patterns, an AI model may be trained to identify anomalous micro expressions, etc. In an arrangement, a single AI model may be trained to identify two or more of anomalous characteristics associated with an individual based on millimeter wave scanner measurements, movement patterns, dressing patterns, path patterns, and micro expressions.

At step 504, the electronic monitoring platform 104 may receive, from a millimeter wave scanner at the retail banking physical location, measurements associated with concealed objects carried by an individual. At step 506, the electronic monitoring platform may receive a video from a video camera at the retail banking physical location. The electronic monitoring platform 508 may use an AI engine (e.g., using an image recognition algorithm based on a convolutional neural network) to identify movement patterns (e.g., a gait, a pace, a posture, etc.), a path pattern, a dressing pattern, and micro expressions associated with the individual.

At step 510, the electronic monitoring platform 104 may use a generated AI model to determine whether millimeter wave scanner measurements associated with the individual are anomalous (e.g., in a manner as described with respect to FIG. 3). At step 512, the electronic monitoring platform 104 may use a generated AI model to determine whether movement patterns associated with the individual are anomalous (e.g., in a manner as described with respect to FIG. 4). At step 514, the electronic monitoring platform 104 may use a generated AI model (and received weather reports from a server associated with a weather service) to determine whether a dressing pattern associated with the individual are anomalous. At step 516, the electronic monitoring platform 104 may use a generated AI model to determine whether micro expressions associated with the individual are anomalous. At step 518, the electronic monitoring platform 518 may determine that characteristics associated with the individual are not anomalous if none of the millimeter wave scanner measurements, movement patterns, a dressing pattern, and micro expressions associated with the individual are determined to be anomalous. However, if one or more of the millimeter wave scanner measurements, movement patterns, a dressing pattern, and micro expressions associated with the individual are determined to be anomalous, the electronic monitoring platform 104 may send notification(s) to one or more devices in the network (e.g., actuators 128, the administrative computing device 108, and/or the user computing device 112).

Figure 6:
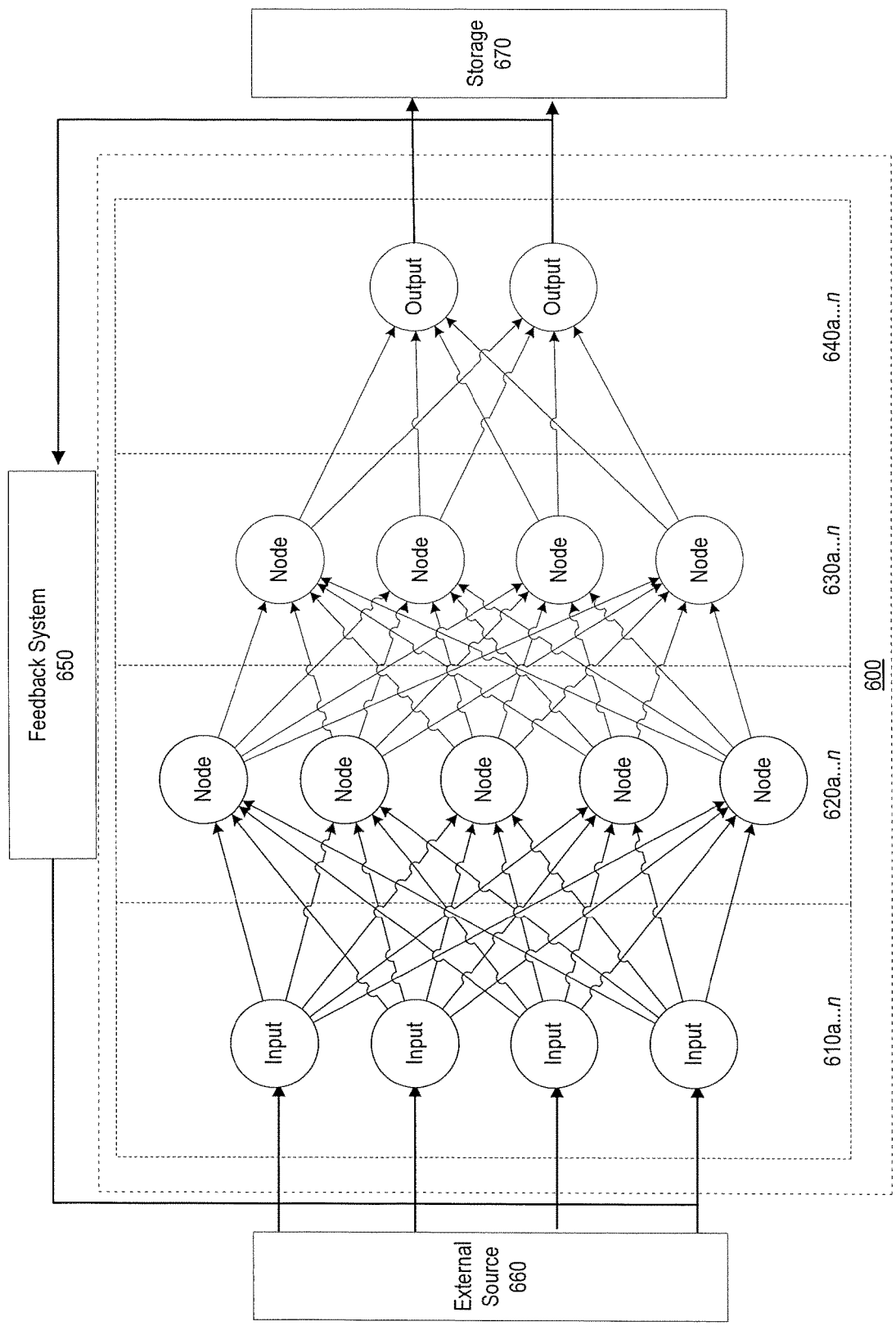
FIG. 6 shows a simplified example of an artificial neural network on which a machine learning algorithm may be executed, in accordance with one or more example arrangements.

FIG. 6 illustrates a simplified example of an artificial neural network 600 on which a machine learning algorithm may be executed. The machine learning algorithm may be used by the AI engine 150-2 to perform one or more functions of the electronic monitoring platform 104, as described herein. FIG. 6 is merely an example of nonlinear processing using an artificial neural network; other forms of nonlinear processing may be used to implement a machine learning algorithm in accordance with features described herein.

In one example, a framework for a machine learning algorithm may involve a combination of one or more components, sometimes three components: (1) representation, (2) evaluation, and (3) optimization components. Representation components refer to computing units that perform steps to represent knowledge in different ways, including but not limited to as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks. Such structures, while significantly more complex than conventional computer systems, are beneficial in implementing machine learning. For example, an artificial neural network may be comprised of a large set of nodes which, like neurons, may be dynamically configured to effectuate learning and decision-making.

Machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, an administrator.

Meanwhile, in supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of 1000 photos with labeled human faces and 10,000 random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "95% correct").

One theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components are tuned by data scientists to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system. Meanwhile, one or more of data integration, selection, cleaning, and/or pre-processing steps can sometimes be the most time consuming because the old adage, "garbage in, garbage out," also reigns true in machine learning systems.

By way of example, in FIG. 6, each of input nodes 610a-n is connected to a first set of processing nodes 620a-n. Each of the first set of processing nodes 620a-n is connected to each of a second set of processing nodes 630a-n. Each of the second set of processing nodes 630a-n is connected to each of output nodes 640a-n. Though only two sets of processing nodes are shown, any number of processing nodes may be implemented. Similarly, though only four input nodes, five processing nodes, and two output nodes per set are shown in FIG. 6, any number of nodes may be implemented per set. Data flows in FIG. 6 are depicted from left to right: data may be input into an input node, may flow through one or more processing nodes, and may be output by an output node. Input into the input nodes 610a-n may originate from an external source 660. The input from the input nodes may be, for example, sensor measurements (e.g., gas concentration measurements, millimeter wave scanner measurements) and or other characteristics associated with an individual (e.g., movement patterns, path patterns, dressing patterns, micro expressions, etc.). Output may be sent to a feedback system 650 and/or to storage 670. The output from an output node may be an indication of whether the sensor measurements and/or other characteristics associated with the individual are anomalous. The output from an output node may be a notification to a notification to one or more devices in the network (e.g., the actuators 128, the administrative computing device 108, and/or the user computing device 112). The output from an output node may be a notification to the administrative computing device 108 to manually review the sensor measurements and/or video footage from the video cameras 404. The feedback system 650 may send output to the input nodes 610a-n for successive processing iterations with the same or different input data.

In one illustrative method using feedback system 650, the system may use machine learning to determine an output. The system may use one of a myriad of machine learning models including xg-boosted decision trees, auto-encoders, perceptron, decision trees, support vector machines, regression, and/or a neural network. The neural network may be any of a myriad of type of neural networks including a feed forward network, radial basis network, recurrent neural network, long/short term memory, gated recurrent unit, auto encoder, variational autoencoder, convolutional network, residual network, Kohonen network, and/or other type. In one example, the output data in the machine learning system may be represented as multi-dimensional arrays, an extension of two-dimensional tables (such as matrices) to data with higher dimensionality.

The neural network may include an input layer, a number of intermediate layers, and an output layer. Each layer may have its own weights. The input layer may be configured to receive as input one or more feature vectors described herein. The intermediate layers may be convolutional layers, pooling layers, dense (fully connected) layers, and/or other types. The input layer may pass inputs to the intermediate layers. In one example, each intermediate layer may process the output from the previous layer and then pass output to the next intermediate layer. The output layer may be configured to output a classification or a real value. In one example, the layers in the neural network may use an activation function such as a sigmoid function, a Tanh function, a ReLu function, and/or other functions. Moreover, the neural network may include a loss function. A loss function may, in some examples, measure a number of missed positives; alternatively, it may also measure a number of false positives. The loss function may be used to determine error when comparing an output value and a target value. For example, when training the neural network the output of the output layer may be used as a prediction and may be compared with a target value of a training instance to determine an error. The error may be used to update weights in each layer of the neural network.

In one example, the neural network may include a technique for updating the weights in one or more of the layers based on the error. The neural network may use gradient descent to update weights. Alternatively, the neural network may use an optimizer to update weights in each layer. For example, the optimizer may use various techniques, or combination of techniques, to update weights in each layer. When appropriate, the neural network may include a mechanism to prevent overfitting— regularization (such as L1 or L2), dropout, and/or other techniques. The neural network may also increase the amount of training data used to prevent overfitting.

Once data for machine learning has been created, an optimization process may be used to transform the machine learning model. The optimization process may include (1) training the data to predict an outcome, (2) defining a loss function that serves as an accurate measure to evaluate the machine learning model's performance, (3) minimizing the loss function, such as through a gradient descent algorithm or other algorithms, and/or (4) optimizing a sampling method, such as using a stochastic gradient descent (SGD) method where instead of feeding an entire dataset to the machine learning algorithm for the computation of each step, a subset of data is sampled sequentially.

In one example, FIG. 6 depicts nodes that may perform various types of processing, such as discrete computations, computer programs, and/or mathematical functions implemented by a computing device. For example, the input nodes $610a$-$n$ may comprise logical inputs of different data sources, such as one or more data servers. The processing nodes $620a$-$n$ may comprise parallel processes executing on multiple servers in a data center. And, the output nodes $640a$-$n$ may be the logical outputs that ultimately are stored in results data stores, such as the same or different data servers as for the input nodes $610a$-$n$. Notably, the nodes need not be distinct. For example, two nodes in any two sets may perform the exact same processing. The same node may be repeated for the same or different sets.

Each of the nodes may be connected to one or more other nodes. The connections may connect the output of a node to the input of another node. A connection may be correlated with a weighting value. For example, one connection may be weighted as more important or significant than another, thereby influencing the degree of further processing as input traverses across the artificial neural network. Such connections may be modified such that the artificial neural network $600$ may learn and/or be dynamically reconfigured. Though nodes are depicted as having connections only to successive nodes in FIG. 6, connections may be formed between any nodes. For example, one processing node may be configured to send output to a previous processing node.

Input received in the input nodes $610a$-$n$ may be processed through processing nodes, such as the first set of processing nodes $620a$-$n$ and the second set of processing nodes $630a$-$n$. The processing may result in output in output nodes $640a$-$n$. As depicted by the connections from the first set of processing nodes $620a$-$n$ and the second set of processing nodes $630a$-$n$, processing may comprise multiple steps or sequences. For example, the first set of processing nodes $620a$-$n$ may be a rough data filter, whereas the second set of processing nodes $630a$-$n$ may be a more detailed data filter.

The artificial neural network $600$ may be configured to effectuate decision-making. As a simplified example for the purposes of explanation, the artificial neural network $600$ may be configured to detect faces in photographs. The input nodes $610a$-$n$ may be provided with a digital copy of a photograph. The first set of processing nodes $620a$-$n$ may be each configured to perform specific steps to remove non-facial content, such as large contiguous sections of the color red. The second set of processing nodes $630a$-$n$ may be each configured to look for rough approximations of faces, such as facial shapes and skin tones. Multiple subsequent sets may further refine this processing, each looking for further more specific tasks, with each node performing some form of processing which need not necessarily operate in the furtherance of that task. The artificial neural network $600$ may then predict the location on the face. The prediction may be correct or incorrect.

The feedback system $650$ may be configured to determine whether or not the artificial neural network $600$ made a correct decision. Feedback may comprise an indication of a correct answer and/or an indication of an incorrect answer and/or a degree of correctness (e.g., a percentage). For example, in the facial recognition example provided above, the feedback system $650$ may be configured to determine if the face was correctly identified and, if so, what percentage of the face was correctly identified. The feedback system $650$ may already know a correct answer, such that the feedback system may train the artificial neural network $600$ by indicating whether it made a correct decision. The feedback system $650$ may comprise human input, such as an administrator telling the artificial neural network $600$ whether it made a correct decision. The feedback system may provide feedback (e.g., an indication of whether the previous output was correct or incorrect) to the artificial neural network $600$ via input nodes $610a$-$n$ or may transmit such information to one or more nodes. The feedback system $650$ may additionally or alternatively be coupled to the storage $670$ such that output is stored. The feedback system may not have correct answers at all, but instead base feedback on further processing: for example, the feedback system may comprise a system programmed to identify faces, such that the feedback allows the artificial neural network $600$ to compare its results to that of a manually programmed system.

The artificial neural network $600$ may be dynamically modified to learn and provide better input. Based on, for example, previous input and output and feedback from the feedback system $650$, the artificial neural network $600$ may modify itself. For example, processing in nodes may change and/or connections may be weighted differently. Following on the example provided previously, the facial prediction may have been incorrect because the photos provided to the algorithm were tinted in a manner which made all faces look red. As such, the node which excluded sections of photos containing large contiguous sections of the color red could be considered unreliable, and the connections to that node may be weighted significantly less. Additionally or alternatively, the node may be reconfigured to process photos differently. The modifications may be predictions and/or guesses by the artificial neural network 600, such that the artificial neural network 600 may vary its nodes and connections to test hypotheses.

The artificial neural network 600 need not have a set number of processing nodes or number of sets of processing nodes, but may increase or decrease its complexity. For example, the artificial neural network 600 may determine that one or more processing nodes are unnecessary or should be repurposed, and either discard or reconfigure the processing nodes on that basis. As another example, the artificial neural network 600 may determine that further processing of all or part of the input is required and add additional processing nodes and/or sets of processing nodes on that basis.

The feedback provided by the feedback system 650 may be mere reinforcement (e.g., providing an indication that output is correct or incorrect, awarding the machine learning algorithm a number of points, or the like) or may be specific (e.g., providing the correct output). For example, the machine learning algorithm 600 may be asked to detect faces in photographs. Based on an output, the feedback system 650 may indicate a score (e.g., 75% accuracy, an indication that the guess was accurate, or the like) or a specific response (e.g., specifically identifying where the face was located).

The artificial neural network 600 may be supported or replaced by other forms of machine learning. For example, one or more of the nodes of artificial neural network 600 may implement a decision tree, associational rule set, logic programming, regression model, cluster analysis mechanisms, Bayesian network, propositional formulae, generative models, and/or other algorithms or forms of decision-making. The artificial neural network 600 may effectuate deep learning.

Various examples described herein may enable efficient detection of anomalies at a physical location and notification of the same. Various examples herein may enable proactive measures to be undertaken based on AI-based detection of anomalies based on sensor-measured user activity and/or physical phenomena.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. An artificial intelligence (AI)-based system for monitoring and securing a retail banking physical location, the system comprising:
   one or more video cameras at the physical location;
   one or more actuators associated with security systems at the physical location;
   an electronic monitoring platform communicatively coupled to the one or more video cameras and the one or more actuators, the electronic monitoring platform comprising:
      at least one processor;
      a communication interface communicatively coupled to the at least one processor; and
      memory storing computer-readable instructions that, when executed by the at least one processor, cause the electronic monitoring platform to:

receive, from the one or more video cameras and via the communication interface, videos associated with the physical location;

identify, based on the videos, speech and movement patterns associated with a plurality of individuals at the physical location;

train, based on the speech and the movement patterns associated with the plurality of individuals, an AI model to recognize:

normal movement patterns and normal speech, wherein the training the AI model to recognize normal movement patterns and normal speech comprises performing a cluster analysis to group normal movement patterns and normal speech, and anomalous movement patterns and anomalous speech outside the grouped normal movement patterns and normal speech;

identify, based on the videos, speech and a movement pattern associated with an individual;

determine, based on the AI model, that the speech and the movement pattern associated with the individual is anomalous, wherein the determining that the speech and movement pattern associated with the individual is anomalous is based on determining that the movement pattern and the speech associated with the individual is outside the grouped normal movement patterns and normal speech; and based on the determining:

send, via the communication interface, one or more notifications to the one or more actuators, wherein at least one actuator of the one or more actuators is associated with a vault in the physical location, and wherein the actuator causes the vault to lock based on receiving a notification, and send, via the communication interface, an alert notification to a computing device.

2. The system of claim 1, wherein the computer-readable instructions, when executed by the at least one processor, further cause the electronic monitoring platform to:

receive, from one or more second video cameras in a second location adjacent to the physical location, a plurality of images; and based on the determining:

identify, based on an image recognition algorithm and in the plurality of images, the individual; and send, to the computing device and based on the identifying, the plurality of images.

3. The system of claim 1, wherein at least one second actuator of the one or more actuators is associated with a shutter at a teller window in the physical location, and wherein the second actuator causes the shutter to activate based on receiving a second notification.

4. The system of claim 1, wherein the training the AI model further comprises training the AI model based on:

archived videos associated with the physical location as stored in a database; and archived videos associated with other physical locations as stored in the database.

5. The system of claim 1, wherein the identifying the movement patterns associated with the plurality of individuals comprises determining gaits, paces, and postures associated with the plurality of individuals.

6. The system of claim 1, wherein the performing the cluster analysis comprises performing one of:

hierarchical clustering;
centroid based clustering;
density based clustering;
distribution based clustering; and
combinations thereof.

7. The system of claim 1, wherein the AI model is based on one of:

a logistic regression model;
a decision tree model;
a random forest model;
a convolutional neural network;
a generative adversarial network;
a support vector machine; and
combinations thereof.

8. The system of claim 1, wherein the system further comprises a millimeter wave scanner configured to scan individuals at the physical location, and wherein the computer-readable instructions, when executed by the at least one processor, cause the electronic monitoring platform to:

receive, from the millimeter wave scanner, a measurement associated with the individual;

wherein the sending the one or more notifications is further based on the measurement exceeding a threshold value.

9. The system of claim 8, wherein the measurement corresponds to a size of concealed objects associated with the individual.

10. A method for monitoring and securing a retail banking physical location, the method comprising:

receiving, from one or more video cameras at the physical location, videos associated with the physical location;

identifying, based on the videos, speech and movement patterns associated with a plurality of individuals at the physical location;

training, based on the speech and the movement patterns associated with the plurality of individuals, an AI model to recognize:

normal movement patterns and normal speech, wherein the training the AI model to recognize normal movement patterns and normal speech comprises performing a cluster analysis to group normal movement patterns and normal speech, and anomalous movement patterns and anomalous speech outside the grouped normal movement patterns and normal speech;

identifying, based on the videos, speech and a movement pattern associated with an individual;

determining, based on the AI model, that the speech and the movement pattern associated with the individual is anomalous, wherein the determining that the movement pattern and the speech associated with the individual is anomalous is based on determining that the movement pattern and the speech associated with the individual is outside the grouped normal movement patterns and normal speech; and based on the determining:

sending one or more notifications to one or more actuators, wherein at least one actuator of the one or more actuators is associated with a vault in the physical location, and wherein the actuator causes the vault to lock based on receiving a notification, and sending an alert notification to a computing device.

11. The method of claim 10, further comprising:

receiving, from one or more second video cameras in a second location adjacent to the physical location, a plurality of images; and based on the determining:
    identifying, based on an image recognition algorithm and in the plurality of images, the individual; and
    sending, to the computing device and based on the identifying, the plurality of images.

12. The method of claim 10, wherein the training the AI model further comprises training the AI model based on:
    archived videos associated with the physical location as stored in a database; and
    archived videos associated with other physical locations as stored in the database.

13. The method of claim 10, wherein the identifying the movement patterns associated with the plurality of individuals comprises determining gaits, paces, and postures associated with the plurality of individuals.

14. The method of claim 10, further comprising:
    receiving, from a millimeter wave scanner configured to scan individuals at the physical location, a measurement associated with the individual, wherein the sending the one or more notifications is further based on the measurement exceeding a threshold value.

15. The method of claim 14, wherein the measurement corresponds to a size of concealed objects associated with the individual.

16. The method of claim 10, wherein the performing the cluster analysis comprises performing one of:
    hierarchical clustering;
    centroid based clustering;
    density based clustering;
    distribution based clustering; and
    combinations thereof.

17. The method of claim 10, wherein the AI model is based on one of:
    a logistic regression model;
    a decision tree model;
    a random forest model;
    a convolutional neural network;
    a generative adversarial network;
    a support vector machine; and
    combinations thereof.

18. A non-transitory computer-readable medium storing computer-executable instructions that, when executed by a computer processor, causes a computing platform to:
    receive, from one or more video cameras at a physical location, videos associated with the physical location;
    identify, based on the videos, speech and movement patterns associated with a plurality of individuals at the physical location;
    train, based on the speech and the movement patterns associated with the plurality of individuals, an AI model to recognize:
        normal movement patterns and normal speech, wherein the training the AI model to recognize normal movement patterns and normal speech comprises performing a cluster analysis to group normal movement patterns and normal speech, and
        anomalous movement patterns and anomalous speech outside the grouped normal movement patterns and normal speech;
    identify, based on the videos, speech and a movement pattern associated with an individual;
    determine, based on the AI model, that the speech and the movement pattern associated with the individual is anomalous, wherein the determining that the speech and movement pattern associated with the individual is anomalous is based on determining that the movement pattern and the speech associated with the individual is outside the grouped normal movement patterns and normal speech; and
    based on the determining:
        send one or more notifications to one or more actuators, wherein at least one actuator of the one or more actuators is associated with a vault in the physical location, and wherein the actuator causes the vault to lock based on receiving a notification, and
        send an alert notification to a computing device.

* * * * *